(12) United States Patent
Gardner et al.

(10) Patent No.: US 10,591,103 B1
(45) Date of Patent: Mar. 17, 2020

(54) TUBE CONNECTOR ASSEMBLY

(71) Applicant: Mercury Plastics LLC, Middlefield, OH (US)

(72) Inventors: Scott R. Gardner, Chagrin Falls, OH (US); Donald Currey, Chagrin Falls, OH (US); Russell Clayton, Gladwin, MI (US)

(73) Assignee: Mercury Plastics LLC, Middlefield, OH (US)

( * ) Notice: Subject to any disclaimer, the term of this patent is extended or adjusted under 35 U.S.C. 154(b) by 148 days.

(21) Appl. No.: 15/442,011

(22) Filed: Feb. 24, 2017

Related U.S. Application Data

(60) Provisional application No. 62/299,682, filed on Feb. 25, 2016.

(51) Int. Cl.
| | |
|---|---|
| *F16L 19/02* | (2006.01) |
| *F16L 57/00* | (2006.01) |
| *F16L 19/06* | (2006.01) |
| *F16L 19/025* | (2006.01) |
| *F16L 19/028* | (2006.01) |

(52) U.S. Cl.
CPC ............. *F16L 57/005* (2013.01); *F16L 19/02* (2013.01); *F16L 19/025* (2013.01); *F16L 19/0225* (2013.01); *F16L 19/0231* (2013.01); *F16L 19/0286* (2013.01); *F16L 19/06* (2013.01)

(58) Field of Classification Search
CPC ....... F16L 19/02; F16L 19/0225; F16L 19/06; F16L 19/025; F16L 19/0286; F16L 19/0231

USPC .................................................. 285/249, 389
See application file for complete search history.

(56) References Cited

U.S. PATENT DOCUMENTS

| | | | |
|---|---|---|---|
| D57,407 S | 3/1921 | Walker | |
| 2,082,164 A | 6/1937 | Karrer | |
| 2,251,718 A | 8/1941 | Parker | |
| 2,295,830 A | 9/1942 | Carlson | |
| 2,313,780 A | 3/1943 | Snyder | |
| D191,883 S | 12/1961 | Wing | |
| 5,732,985 A * | 3/1998 | Suzuki | F16L 19/0225 285/332 |
| 5,984,373 A * | 11/1999 | Fitoussi | A61M 5/3213 285/332 |
| 6,527,452 B1 * | 3/2003 | Sejourne | G02B 6/3821 385/134 |
| 8,039,745 B2 | 10/2011 | Sedor et al. | |
| 2006/0163873 A1 * | 7/2006 | Langhuber | F02M 55/005 285/386 |

(Continued)

FOREIGN PATENT DOCUMENTS

| | | | | |
|---|---|---|---|---|
| CN | 203445586 U | | 2/2014 | |
| EP | 2360405 A1 * | | 8/2011 | .......... F16L 19/0225 |
| FR | 424523 A * | | 5/1911 | .......... F16L 19/0225 |

(Continued)

*Primary Examiner* — David Bochna
*Assistant Examiner* — James A Linford
(74) *Attorney, Agent, or Firm* — Hahn Loeser & Parks LLP

(57) ABSTRACT

Embodiments of the present invention include a tube connector assembly connectable to a fitting in an installed position. The tube connector assembly includes a tube with a retainer and nut received about the tube for engaging the retainer. The present invention also includes embodiments of a tube having a retainer and embodiments of a nut having a bend relief portion.

12 Claims, 10 Drawing Sheets

(56) References Cited

U.S. PATENT DOCUMENTS

2011/0154940 A1* 6/2011 Gagne .................. H02G 15/007
74/502.6
2014/0361531 A1 12/2014 Siders et al.

FOREIGN PATENT DOCUMENTS

FR 2831640 A1 * 5/2003 .............. F16L 19/02
WO WO-0196773 A1 * 12/2001 .............. F16L 19/02

* cited by examiner

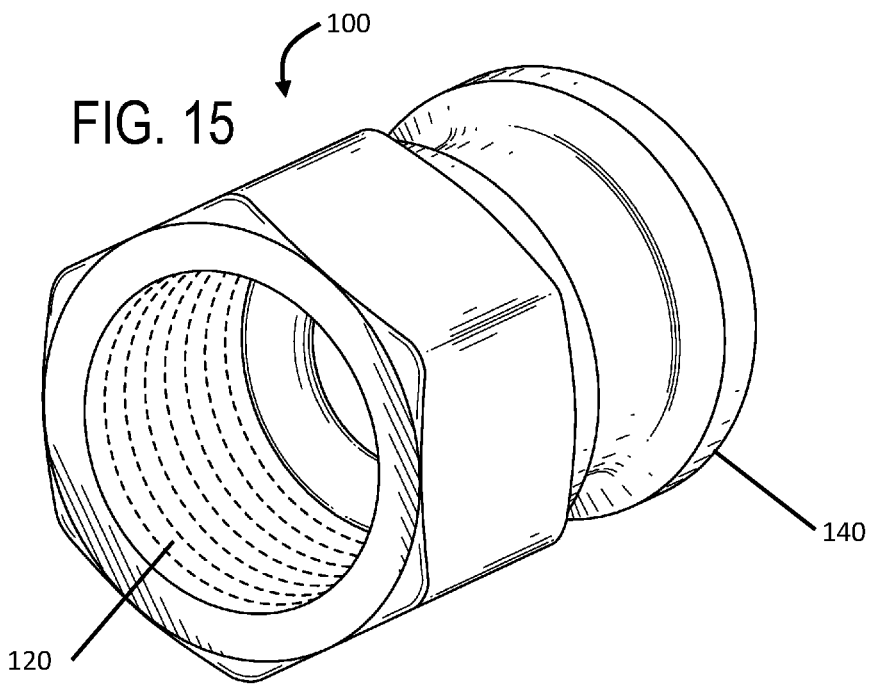
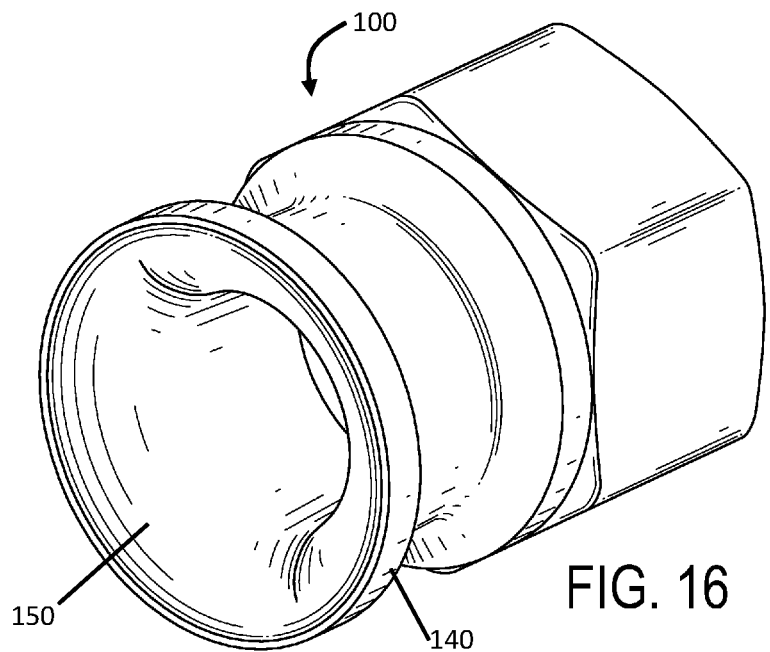

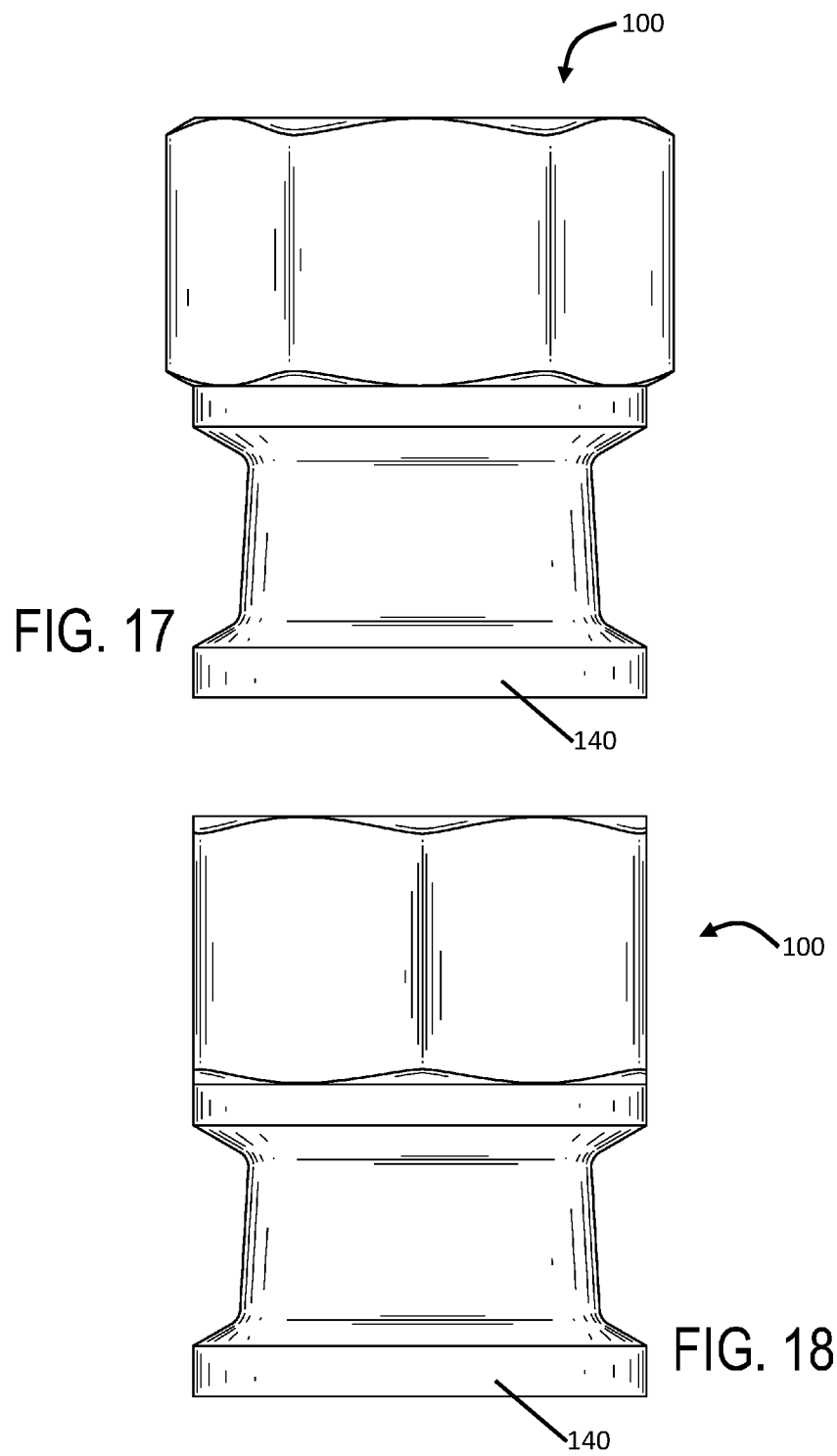

TUBE CONNECTOR ASSEMBLY

This application claims the benefit of U.S. Provisional Patent Application 62/299,682, filed Feb. 25, 2016.

SUMMARY

The invention described herein relates to a method and apparatus by which a tube connector assembly may be made at an appliance.

Particular embodiments of the present invention include a tube connector assembly connectable to a fitting in an installed position. The tube connector assembly comprises a tube having a first end and a retainer at the first tube end. The retainer is overmolded around the tube and includes a sealing surface toward the first tube end. A nut is received about the first tube end wherein the nut comprises a threaded portion and a bend relief portion. The threaded portion includes a threaded inside diameter larger than an outside dimension of the retainer such that the threaded portion surrounds at least a portion of the retainer. The threaded portion may also include a stop portion having a tube aperture of a diameter larger than a dimension of the tube. The stop portion is in contacting engagement with a beveled collar of the retainer when in the installed position. The bend relief portion extends from the tube aperture to an outlet aperture with a diameter greater than the tube aperture. The bend relief portion may include a transition surface between the tube aperture and the outlet aperture.

The present invention also includes embodiments of the tube connectable to a fitting. The tube comprises a first tube end and an oppositely facing second tube end. An elongated hollow tube extends between the first tube end and the second tube end. The tube includes a retainer wherein the elongated hollow tube extends at least partially through the retainer. The retainer may also have a sealing surface oriented toward the first tube end.

Also included in the present invention are embodiments of a nut for connecting a tube to a fitting. The nut comprises a centrally disposed tube aperture configured for slidably moving about an exterior of an elongated hollow tube. The nut also has a threaded portion with a threaded inside diameter. A stop portion of the nut is configured to engage a beveled collar. The nut may also include a bend relief portion extending from the tube aperture wherein the bend relief portion includes a transition surface between the tube aperture and an outlet aperture such that the outlet aperture is larger than the tube aperture.

The foregoing and other objects, features and advantages of the invention will be apparent from the following more detailed descriptions of particular embodiments of the invention, as illustrated in the accompanying drawings wherein like reference numbers represent like parts of the invention.

BRIEF DESCRIPTION OF THE DRAWINGS

Reference is made to the accompanying drawings in which particular embodiments and further benefits of the invention are illustrated as described in more detail in the description below, in which:

FIG. 15 is a perspective view of a nut, in accordance with an embodiment of the invention.

FIG. 16 is another perspective view of the nut shown in FIG. 15, in accordance with an embodiment of this invention.

FIG. 17 is a front view of the nut shown in FIG. 15, in accordance with an embodiment of this invention.

FIG. 18 is a side view of the nut shown in FIG. 15, in accordance with an embodiment of this invention.

DETAILED DESCRIPTION OF THE PREFERRED EMBODIMENTS

Figure 1:
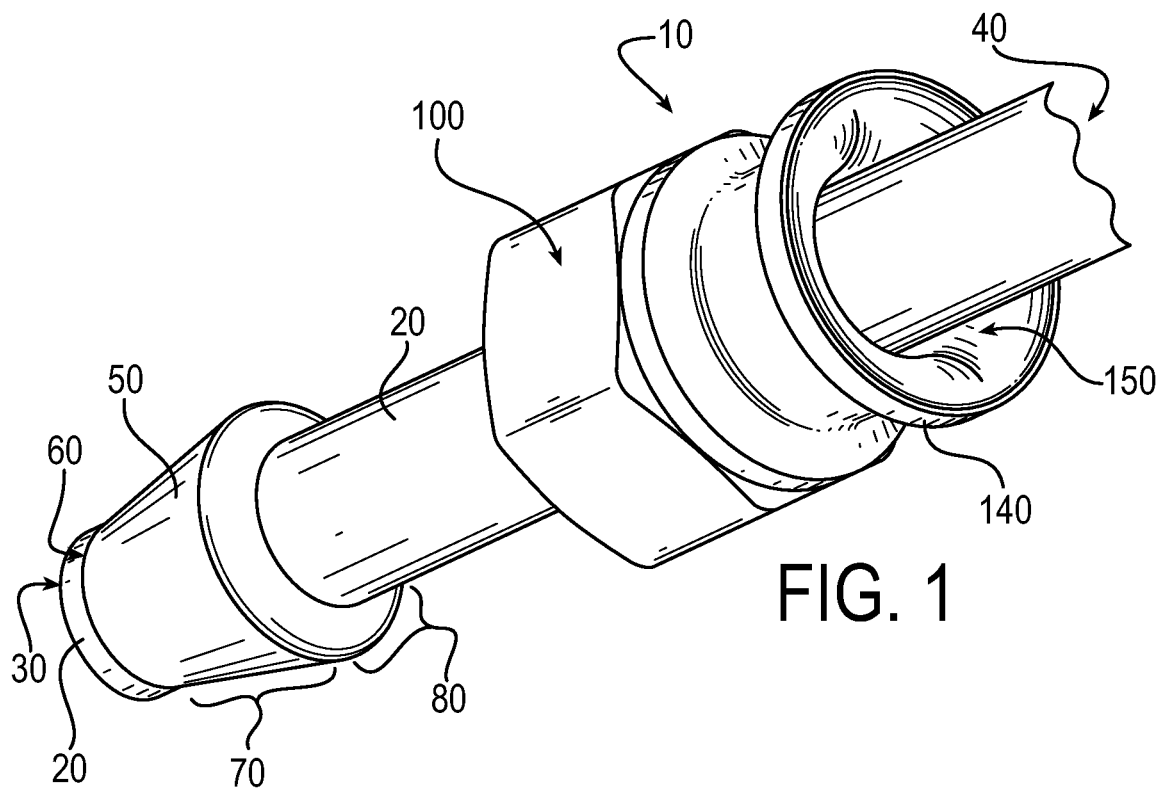
FIG. 1 is a perspective view of a tube connector assembly in an uninstalled position, in accordance with an embodiment of the invention.
Figure 2:
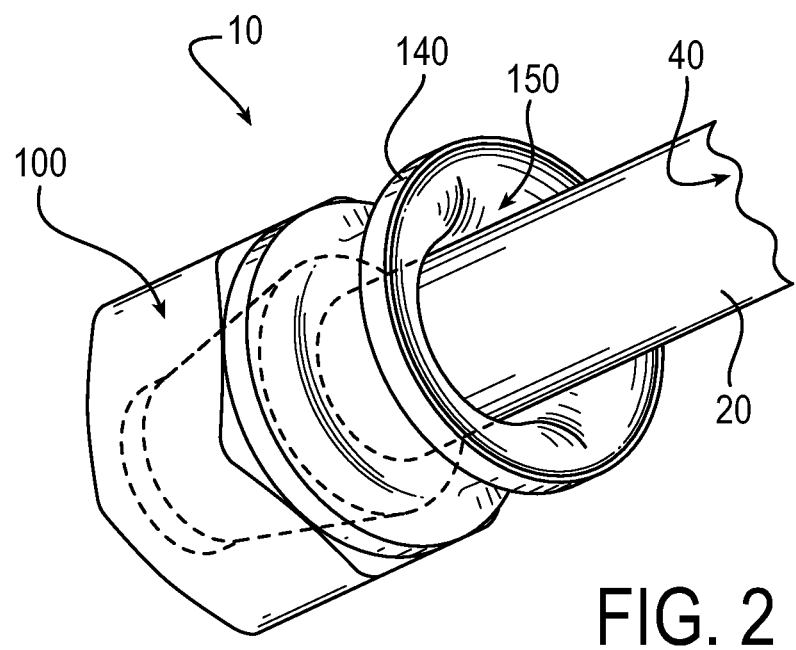
FIG. 2 is a perspective view of a tube connector assembly in an installed position, in accordance with an embodiment of the invention.
Figure 3:
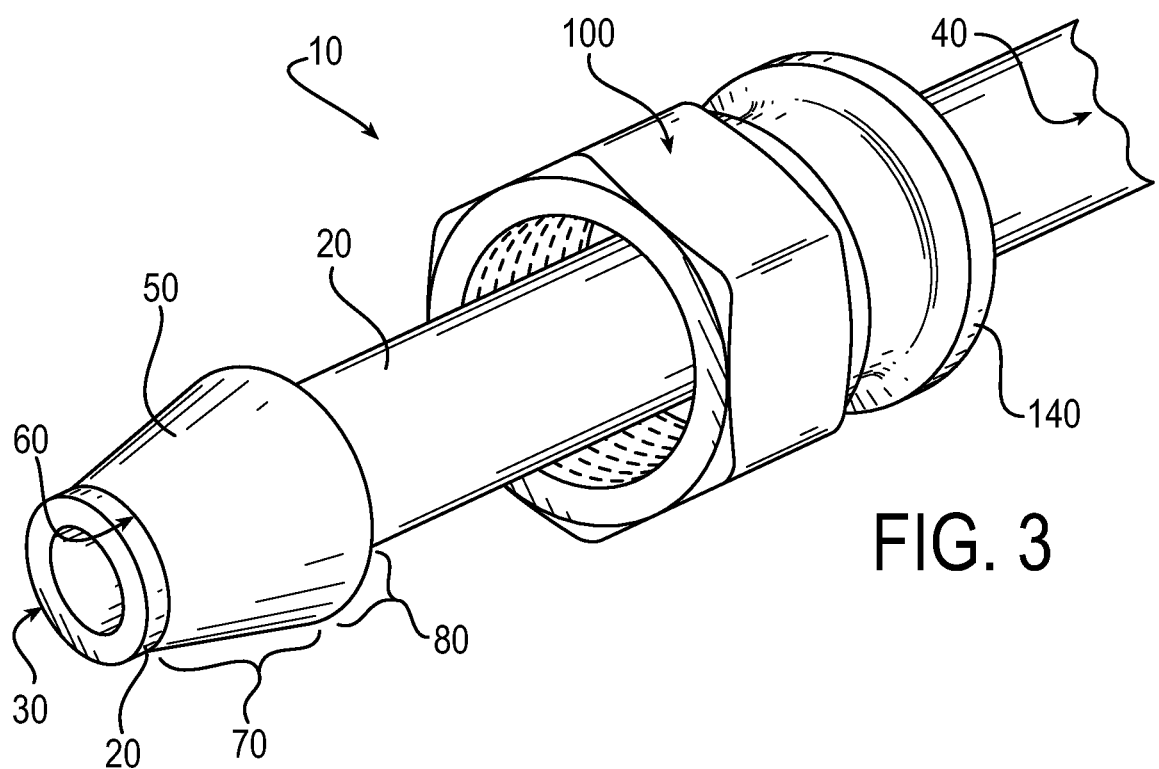
FIG. 3 is a perspective view of a tube connector assembly in an uninstalled position, in accordance with an embodiment of the invention.
Figure 4:
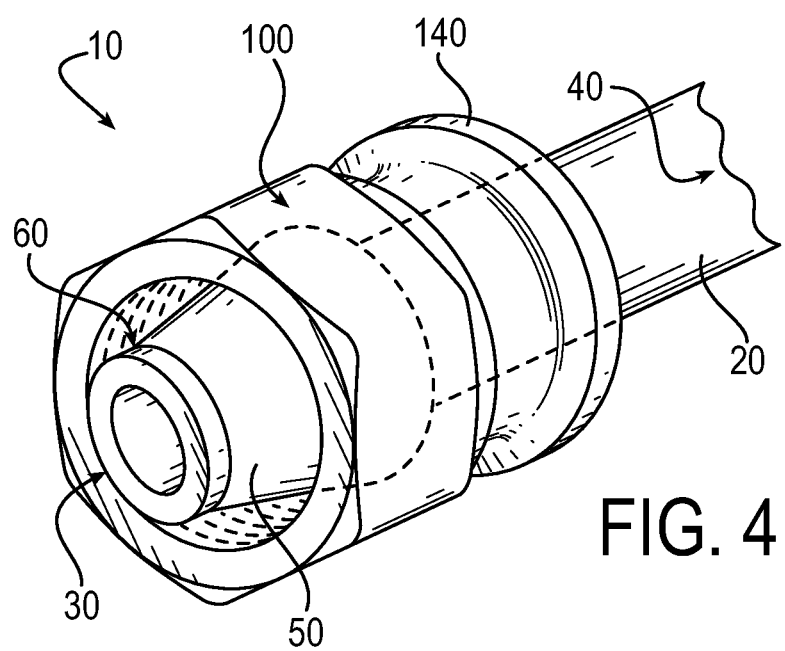
FIG. 4 is a perspective view of a tube connector assembly in an installed position, in accordance with an embodiment of the invention.
Figure 5:
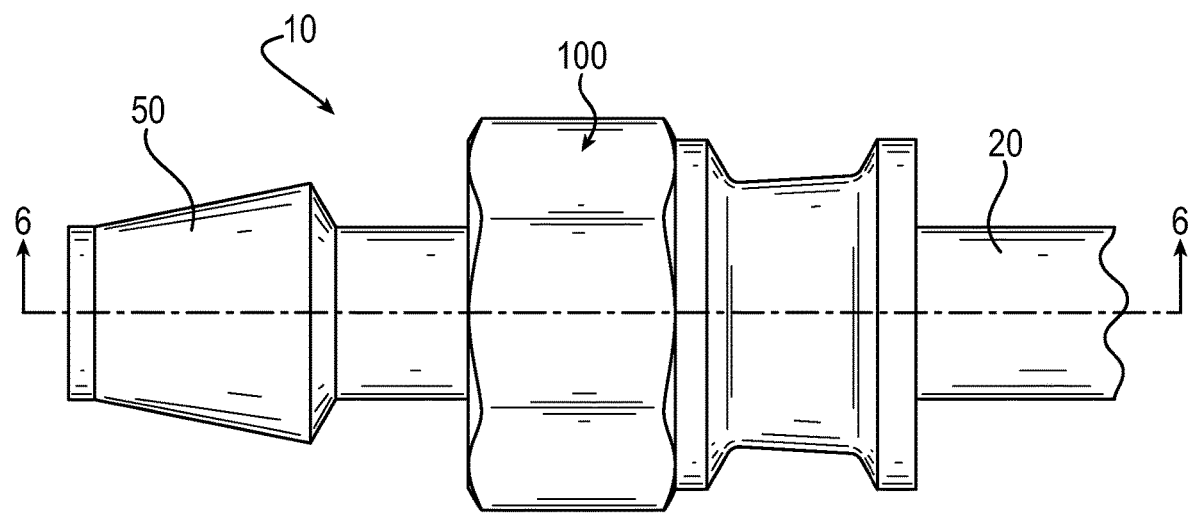
FIG. 5 is a side view of a tube connector assembly in an uninstalled position, in accordance with an embodiment of the invention.

Referring now to the drawings wherein the figures are for the purpose of illustrating the preferred embodiments of the invention and not for purposes of limiting the same, the Figures show a tube connector assembly.

As shown in FIGS. 1-4, a tube connector assembly 10 comprises a tube 20 having a first tube end 30 and an oppositely facing second tube end 40. Tube 20 may be an extruded tube. Tube connector assembly 10 may be used to connect a water line to an appliance, such as refrigerator. For example, tube connector assembly may connect a water line to an ice maker and/or water dispenser of a refrigerator. The second tube end 40 may be configured for the same or, alternatively, a different configuration for connecting to a different component within or about a refrigeration unit or external hook-up.

Figure 6:
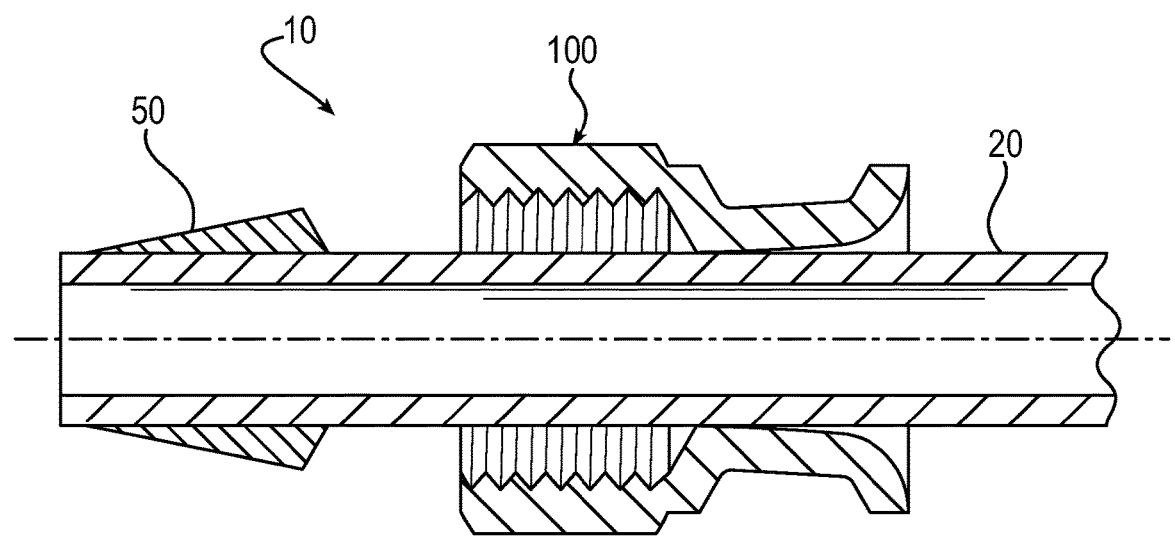
FIG. 6 is a cross-sectional view taken at line 6-6 of FIG. 5 of a tube connector assembly in an uninstalled position, in accordance with an embodiment of the invention.

In particular embodiments and as illustrated by FIGS. 1-6, the tube connector assembly 10 is formed about the first tube end 30 of the tube 20. In this particular embodiment, tube connector assembly 10 further comprises a retainer 50. In one of the embodiments, retainer is overmolded around tube 20. In an exemplary embodiment, as illustrated by FIGS. 1-6, the tube 20 extends through the retainer 50 at a terminal radial end 60 of the retainer 50. At the terminal radial end 60, the retainer 50 has a sealing surface 70. In the embodiment as illustrated by FIG. 6, the retainer 50 comprises a geometrically radially expanding sealing surface 70 and a beveled collar 80 extending from the terminal radial end 60, respectively. Sealing surface 70 geometrically radially expands away from the first tube end 30. Sealing surface 70 geometrically radially expands towards the beveled collar 80.

Figure 8:
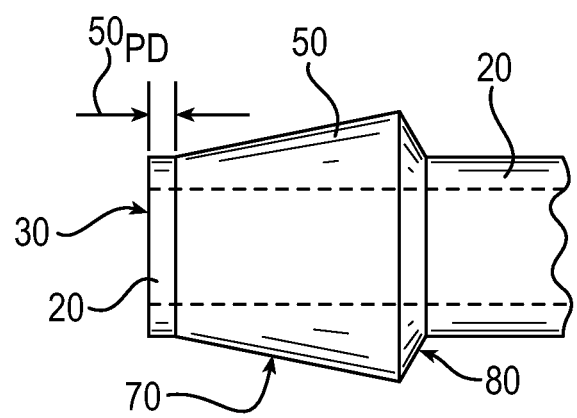
FIG. 8 is a side view of a tube and a retainer, in accordance with an embodiment of the invention.

In various embodiments and as illustrated by FIG. 8, the retainer 50 is offset from the first tube end 30 a predetermined distance $50_{PD}$. In other words, the tube 20 extends entirely through the retainer 50. By extending the tube 20 entirely through the retainer 50 the surface area for overmolding the retainer to the tube is increased in contrast to a tube which may be seated into and only partially extend through the retainer. By increasing the surface area at the overmolding, the strength of the overmolding between the retainer and the elongated tube is increased. In an exemplary embodiment, the predetermined distance is between 0 and 0.1 inches. Even more specifically, the predetermined distance may be between 0 and 0.05 inches.

Figure 7:
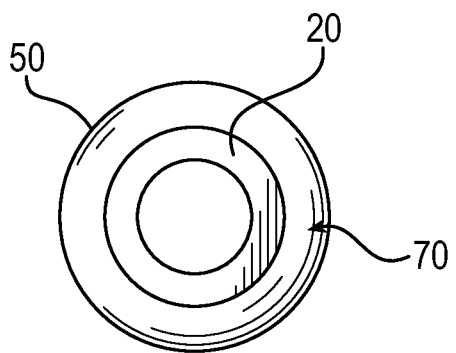
FIG. 7 is an end view from a first tube end of a tube and a retainer, in accordance with an embodiment of the invention.

In various embodiments, the sealing surface 70 is conical. By example, in FIGS. 7-8, the retainer 50 includes the sealing surface 70 in the shape of a nose cone having a conical profile. In other particular embodiments, the sealing surface may be formed of any other shape known in the art. By example, a rectangular expanding sealing surface may be used to mate with an inversely shaped mating fitting.

In variations of these particular embodiments, the sealing surface 70 is offset from the tube end 30 at least the predetermined distance. In an exemplary embodiment, and as illustrated by FIG. 8, the sealing surface 70 extends to the terminal radial end 60. In yet another embodiment, the sealing surface 70 may be positioned on the retainer 50 separate from the terminal radial end 60.

Figure 9:
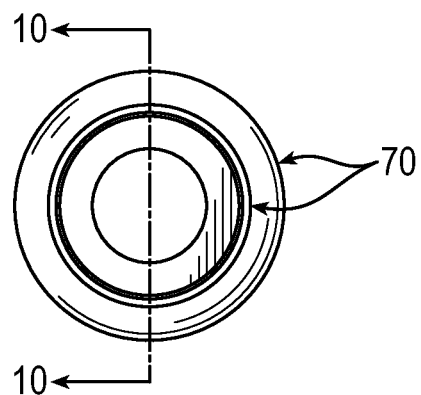
FIG. 9 is an end view from a first tube end of a tube and a retainer, in accordance with an embodiment of the invention.
Figure 10:
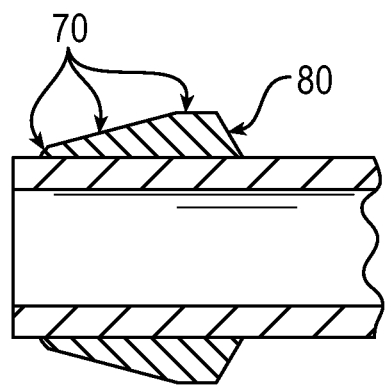
FIG. 10 is a cross-sectional view taken at line 9-9 of FIG. 9 of a tube and a retainer, in accordance with an embodiment of the invention.

In yet another embodiment, the sealing surface 70 may comprise multiple surfaces as illustrated by FIGS. 9-10. In other words the sealing surface has multiple profiles. With multiple surfaces, each surface may be provided at a separate and distinct angle or configuration. Likewise, each surface may be provided with the same surface area or with different surface areas. Similarly, the beveled collar may comprise multiple surfaces.

Figure 11:
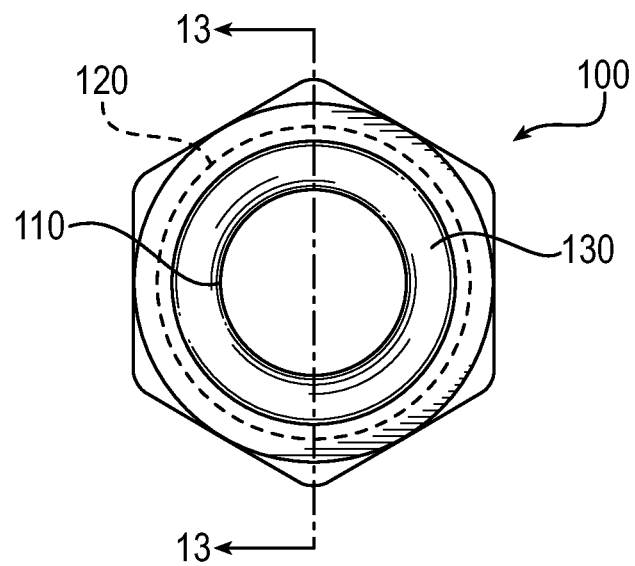
FIG. 11 is an end view from a first tube end of a nut, in accordance with an embodiment of the invention.
Figure 12:
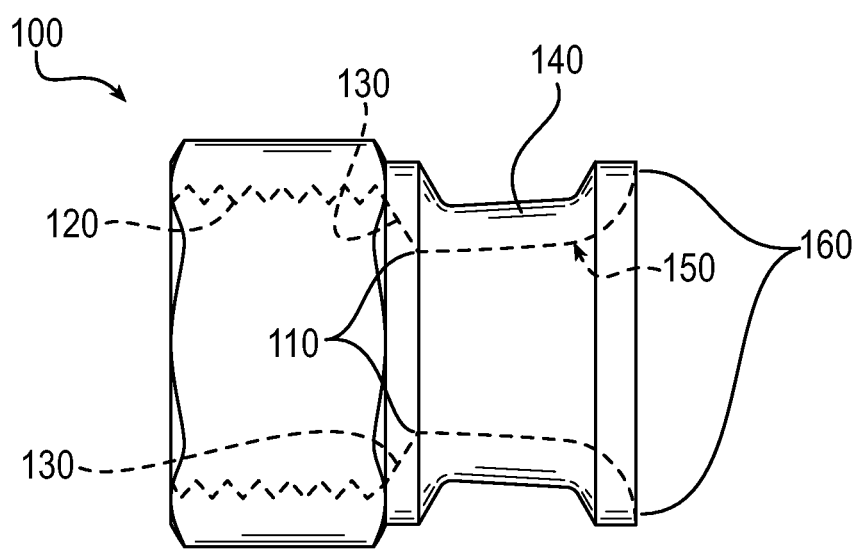
FIG. 12 is a side view of a nut, in accordance with an embodiment of the invention.
Figure 13:
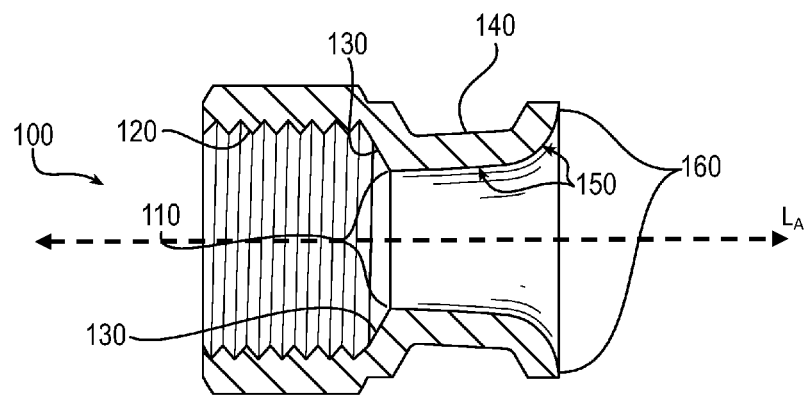
FIG. 13 is a cross-sectional view taken at line 13-13 of FIG. 11 of a nut, in accordance with an embodiment of the invention.

Referring now to FIGS. 11-13, The tube connector assembly 10 additionally comprises a nut 100 received about the second tube end 40. The nut 100 is interposed between the first tube end 30 and the second tube end 40 and includes a centrally disposed tube aperture 110 dimensioned for sliding movement about the exterior diameter of the tube 20. The nut 100 is typically metallic, and may be brass, stainless steel, or other known metal—although it is possible that with the addition of various fillers (e.g., glass-filled) and/or judicious choice of polymer composition, selected polymers may be employed to form the nut. The nut 100 may be hexagonal, or any other known type of nut with an integral number of sides for use with a wrench or other known tool for tightening and loosening of the nut. In one example, the nut 100 may be formed from a single piece of metal, such as brass or stainless steel. This may be done by machining or some other type of known metal forming.

The nut 100 comprises a threaded portion 120. The threaded portion 120 includes a threaded inside diameter larger than an outside dimension of the retainer 50 such that the threaded portion surrounds at least a portion of the retainer 50. Leak-proof engagement is effected through rotational threaded communication with a mating fitting at an appliance connection, such as a refrigerator's ice maker and water dispenser connection, for example. The rotational threaded communication effects longitudinal axial movement by peripheral axial rotational movement of the nut 100 with sealing contact effected by contacting engagement of a portion of the sealing surface 70 on a circumference of an aperture opening in the mating fitting at the desired connection, such as the appliance connection.

Figure 14:
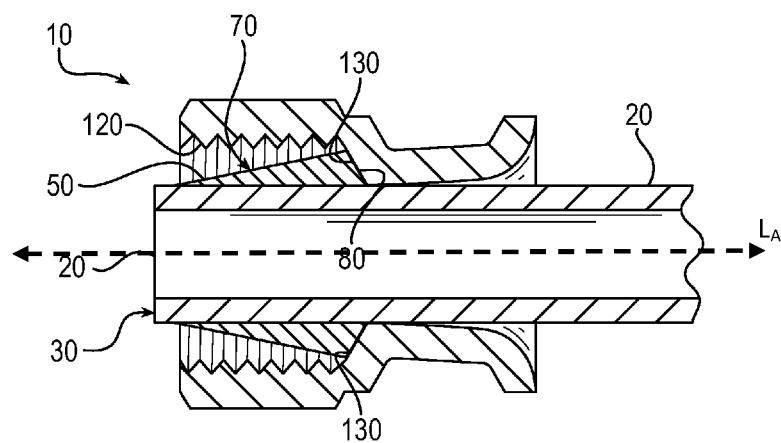
FIG. 14 is a side view of a tube connector assembly comprising a tube, a retainer and a nut, in accordance with an embodiment of the invention.
Figure 19:
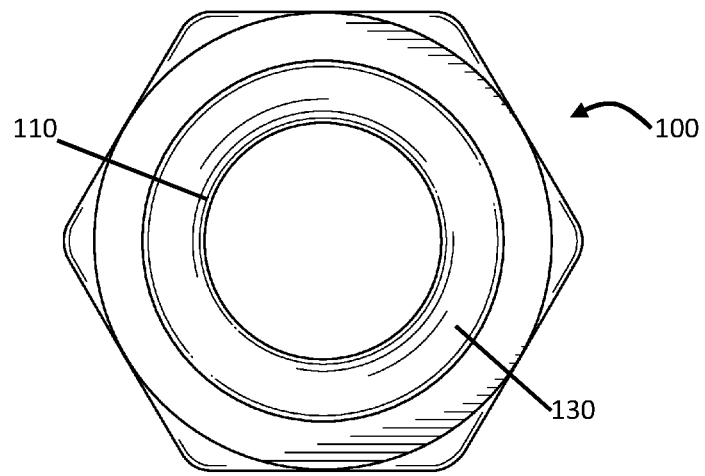
FIG. 19 is a top view of the nut shown in FIG. 15, in accordance with an embodiment of this invention.
Figure 20:
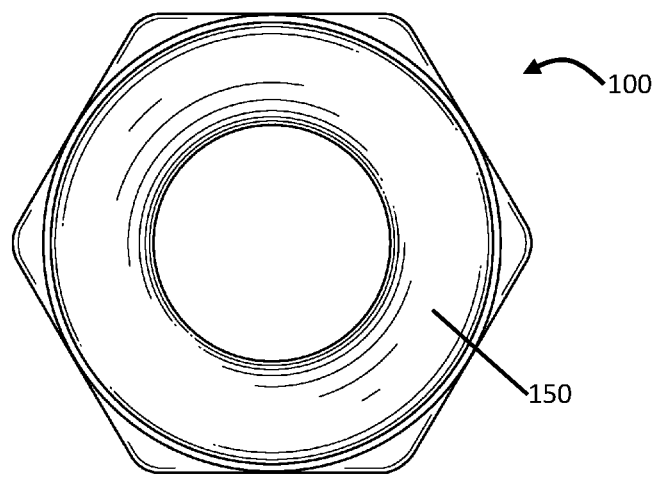
FIG. 20 is a bottom view of the nut shown in FIG. 15, in accordance with an embodiment of this invention.

The tube connector assembly 10 is connectable to a corresponding fitting of an appliance, for example, in an installed position. To draw the sealing surface 70 into contacting engagement with the mating fitting at the appliance, the threaded portion 120 further includes a stop portion 130 having a tube aperture 110 of a diameter larger than a dimension of the tube 20. The tube aperture 110 of the stop portion 130 is formed by an outwardly and end facing hollowed out bore dimensioned and configured to mate with the beveled collar 80 of the retainer 50. As illustrated by FIG. 14, the stop portion 130 is in contacting engagement or mates with the beveled collar 80 of the retainer 50 when in the installed position. Through the rotational threaded connection at the threaded portion 120 and by engaging the beveled collar 80, the stop portion 130 draws the sealing surface 70 of the retainer 50 into contact with the corresponding fitting at the desired connection. When in an installed position, the stop portion 130 asserts force against the beveled collar 80 of the retainer 50 drawing the retainer 50 toward the fitting at the desired connection.

In particular embodiments, the nut 100 further comprises a bend relief portion 140. The bend relief portion 140 extends from the tube aperture 110, toward the second tube end 40 and has an outlet aperture 160 of a diameter greater than the tube aperture 110. The bend relief portion 140 has a transition surface 150 between the tube aperture and the outlet aperture 160. The transition surface provides increasing separation between the surface of the nut and the outer diameter of the tube 20 while the tube is straight and not bent. Therefore, the transition surface removes any centralized forces that may be exerted on the tube when a tube bends along a longitudinal axis $L_A$ at a nut which may terminate at the tube aperture. Instead of exerting a centralized force at a singular location along the tube, as seen when using a conventional nut with right angles terminating at the tube aperture, the transition surface provides decreasing resistance against the tube. This reduces the risk of fracture or breakage by spreading the area of stress over a greater length of the tube.

In yet another embodiment, the inside diameter of the bend relief portion 140 may gradually increase from the tube aperture 110. Further the bend relief portion 140 may change at a different rate. In another embodiment, the inside diameter of the bend relief portion 140 may be constant surface after the tube aperture prior to the transition surface 150.

In various embodiments and as illustrated by FIG. 12, the transition surface 150 is conical. By providing a conical transition surface 150 extending from the tube aperture 110, the bend relief portion 140 maintains a consistent perimeter about the tube 20 in relation to the diameter of the tube 20. This consistent perimeter about the diameter of the tube 20 may extend a singular plane or be variable in a direction extending from the tube aperture 110 to the outlet aperture 160, as illustrated by FIG. 12-13. In one particular embodiment, the transition surface 150 may be convex as it extends from the tube aperture 110 to the outlet aperture 160.

The tube outlet aperture 160 and the transition surface 150 inhibit the tube 20 from bending immediately adjacent the retainer 50. As mentioned above, the transition surface 150 provides decreasing resistance as the tube 20 may bend from the tube aperture 110. At the same time, the transition surface 150 maintains resistance (albeit decreasing) an extended distance from the tube aperture 110. By maintaining a degree of resistance against the tube 20, the transition surface 150 inhibits the tube 20 from over-bending and failing at or near the tube aperture 110. In contrast, a nut without bend relief portion does not inhibit the tube from over-bending and failing at the tube aperture.

As used in this application, the term "overmold" means the process of injection molding a second polymer over a first polymer, wherein the first and second polymers may or may not be the same. In one embodiment of the invention, the composition of the overmolded polymer will be such that it will be capable of at least some melt fusion with the composition of the polymeric tube. There are several means by which this may be affected. One of the simplest procedures is to insure that at least a component of the polymeric tube and that of the overmolded polymer is the same. Alternatively, it would be possible to insure that at least a portion of the polymer composition of the polymeric tube and that of the overmolded polymer is sufficiently similar or compatible so as to permit the melt fusion or blending or alloying to occur at least in the interfacial region between the exterior of the polymeric tube and the interior region of the overmolded polymer. Another manner in which to stat this would be to indicate that at least a portion of the polymer compositions of the polymeric tube and the overmolded polymer are miscible. In contrast, the chemical composition of the polymers may be relatively incompatible, thereby not resulting in a material-to-material bond after the injection overmolding process.

In one embodiment of this invention, polymeric tubing is made from high density polyethylene which is crosslinked. PEX contains crosslinked bonds in the polymer structure changing the thermoplastic into a thermoset. Crosslinking may be accomplished during or after the molding of the part. The required degree of crosslinking for crosslinking polyethylene tubing is between 45-90%. There are three classifications of PEX, referred to as PEX-A, PEX-B, and PEX-C. PEX-A is made by peroxide (Engel) method. In the PEX-A method, peroxide blending with the polymer performs crosslinking above the crystal melting temperature. The polymer is typically kept at high temperature and pressure for long periods of time during the extrusion process. PEX-B is formed by the silane method, also referred to as the "moisture cure" method. In the PEX-B method, silane blended with the polymer induces crosslinking during molding and during secondary post-extrusion processes, producing crosslinks between a crosslinking agent. The process is accelerated with heat and moisture. The crosslinked bonds are formed through silanol condensation between two grafted vinyltrimethoxysilane units. PEX-C is produced by application of an electron beam using high energy electrons to split the carbon-hydrogen bonds and facilitate crosslinking.

Crosslinking imparts shape memory properties to polymers. Shape memory materials have the ability to return from a deformed state (e.g. temporary shape) to their original crosslinked shape (e.g. permanent shape), typically induced by an external stimulus or trigger, such as a temperature change. Alternatively or in addition to temperature, shape memory effects can be triggered by an electric field, magnetic field, light, or a change in pH, or even the passage of time. Shape memory polymers include thermoplastic and thermoset (covalently crosslinked) polymeric materials.

Shape memory materials are stimuli-responsive materials. They have the capability of changing their shape upon application of an external stimulus. A change in shape caused by a change in temperature is typically called a thermally induced shape memory effect. The procedure for using shape memory typically involves conventionally processing a polymer to receive its permanent shape, such as by molding the polymer in a desired shape and crosslinking the polymer defining its permanent crosslinked shape. Afterward, the polymer is deformed and the intended temporary shape is fixed. This process is often called programming. The programming process may consist of heating the sample, deforming, and cooling the sample, or drawing the sample at a low temperature. The permanent crosslinked shape is now stored while the sample shows the temporary shape. Heating the shape memory polymer above a transition temperature $T_{trans}$ induces the shape memory effect providing internal forces urging the crosslinked polymer toward its permanent or crosslinked shape. Alternatively or in addition to the application of an external stimulus, it is possible to apply an internal stimulus (e.g., the passage of time) to achieve a similar, if not identical result.

A chemical crosslinked network may be formed by low doses of irradiation. Polyethylene chains are oriented upon the application of mechanical stress above the melting temperature of polyethylene crystallites, which can be in the range between 60° C. and 13° C. Materials that are most often used for the production of shape memory linear polymers by ionizing radiation include high density polyethylene, low density polyethylene and copolymers of polyethylene and poly(vinyl acetate). After shaping, for example, by extrusion or compression molding, the polymer is covalently crosslinked by means of ionizing radiation, for example, by highly accelerated electrons. The energy and dose of the radiation are adjusted to the geometry of the sample to reach a sufficiently high degree of crosslinking, and hence sufficient fixation of the permanent shape.

Another example of chemical crosslinking includes heating poly(vinyl chloride) under a vacuum resulting in the elimination of hydrogen chloride in a thermal dehydrocholorination reaction. The material can be subsequently crosslinked in an HCl atmosphere. The polymer network obtained shows a shape memory effect. Yet another example is crosslinked poly[ethylene-co-(vinyl acetate)] produced by treating the radical initiator dicumyl peroxide with linear poly[ethylene-co-(vinyl acetate)] in a thermally induced crosslinking process. Materials with different degrees of crosslinking are obtained depending on the initiator concentration, the crosslinking temperature and the curing time. Covalently crosslinked copolymers made form stearyl acrylate, methacrylate, and N,N'-methylenebisacrylamide as a crosslinker.

Additionally shape memory polymers include polyurethanes, polyurethanes with ionic or mesogenic components, block copolymers consisting of polyethyleneterephthalate and polyethyleneoxide, block copolymers containing polystyrene and poly(1,4-butadiene), and an ABA triblock copolymer made from poly(2-methyl-2-oxazoline) and a poly (tetrahydrofuran). Further examples include block copolymers made of polyethylene terephthalate and polyethylene oxide, block copolymers made of polystyrene and poly(1,4-butadiene) as well as ABA triblock copolymers made from poly(tetrahydrofuran) and poly(2-methyl-2-oxazoline). Other thermoplastic polymers which exhibit shape memory characteristics include polynorbornene, and polyethylene grated with nylon-6 that has been produced for example, in a reactive blending process of polyethylene with nylon-6 by adding maleic anhydride and dicumyl peroxide.

The terms "comprising," "including," and "having," as used in the claims and specification herein, shall be considered as indicating an open group that may include other elements not specified. The terms "a," "an," and the singular form of words shall be taken to include the plural form of the same words, such that the terms mean that one or more of something is provided. The terms "at least one" and "one or more" are used interchangeably. The term "single" shall be used to indicate that one and only one of something is intended. Similarly, other specific integer values, such as "two," are used when a specific number of things are intended. The terms "preferably," "preferred," "prefer," "optionally," "may," and similar terms are used to indicate that an item, condition or step being referred to is an optional (i.e., not required) feature of the invention.

While this invention has been described with reference to particular embodiments thereof, it shall be understood that such description is by way of illustration only and should not be construed as limiting the scope of the claimed invention. Accordingly, the scope and content of the invention are to be defined only by the terms of the following claims. Furthermore, it is understood that the features of any specific embodiment discussed herein may be combined with one or more features of any one or more embodiments otherwise discussed or contemplated herein unless otherwise stated.

What is claimed is:

1. A tube connector assembly for connecting to a fitting, the tube connector assembly comprising:
   a tube having a first tube end,
   a retainer attached around the tube proximal the first tube end, the retainer having a sealing surface toward the first tube end and a beveled collar opposite the sealing surface,
   a nut received about the first tube end, the nut comprising an outermost end and an opposite outermost end, the nut further comprising
      a threaded portion, the threaded portion including a threaded inside diameter larger than an outside dimension of the retainer such that the threaded portion surrounds at least a portion of the retainer,
      a stop portion tapered inwardly and away from the threaded portion and forming an interface with the beveled collar of the retainer,
      a tube aperture positioned at an end of the stop portion and being juxtaposed the interface and away from the threaded portion, the tube aperture including a diameter larger than a diameter of the tube, and
      a bend relief portion, the bend relief portion extending in a direction away from the threaded portion from the tube aperture to an outlet aperture of a diameter greater than the tube aperture, the bend relief portion further comprising an inner transition surface between the tube aperture and the opposite outermost end of the nut, the inner transition surface comprising
         a tapered surface extending from the interface and at an angle away from a longitudinal axis of the nut to a radiused surface, the radiused surface extending at a radius away from the longitudinal axis of the nut to an outer circumferential surface of the nut at the opposite outermost end.

2. The tube connector assembly as claimed in claim 1, the tube aperture and the transition surface inhibiting tube bending immediately adjacent the retainer.

3. The tube connector assembly as claimed in claim 1, where the retainer is offset from the first tube end a predetermined distance.

4. The tube connector assembly as claimed in claim 3, where the sealing surface is offset from the first tube end at least the predetermined distance.

5. The tube connector assembly as claimed in claim 3, where the predetermined distance is between 0 and 0.1 inch.

6. The tube connector assembly as claimed in claim 5, where the predetermined distance is between 0 and 0.05 inch.

7. The tube connector assembly as claimed in claim 1, where the sealing surface is conical.

8. The tube connector assembly as claimed in claim 1, wherein the inner transition surface provides increasing separation between the nut and an outer diameter of the tube while the tube is straight and not bent.

9. The tube connector assembly as claimed in claim 1, wherein the bend relief portion generally maintains its thickness from the stop portion to the opposite outermost end of the nut.

10. The tube connector assembly as claimed in claim 1, the threaded portion including a threaded portion outer diameter and the bend relief portion including a bend relief portion outer diameter, wherein threaded portion outer diameter tapers down to the bend relief portion outer diameter at the stop portion.

11. The tube connector assembly as claimed in claim 10, wherein the bend relief portion outer diameter increases after the stop portion towards the opposite outermost end of the nut.

12. The tube connector assembly as claimed in claim 1, the bend relief portion including an inner diameter profile and an outer diameter profile, wherein the inner diameter profile and the outer diameter profile are generally the same and extend away from the longitudinal axis of the nut from the stop portion to the opposite outermost end of the nut.

* * * * *